(Model.)

H. MISHLER.
POTTER'S LATHE.

No. 269,090. Patented Dec. 12, 1882.

Witnesses.
Louis F. Gardner
E. D. York

Inventor:
Henry Mishler
per
F. A. Lehmann,
Atty.

UNITED STATES PATENT OFFICE.

HENRY MISHLER, OF MOGADORE, OHIO.

POTTER'S LATHE.

SPECIFICATION forming part of Letters Patent No. 269,090, dated December 12, 1882.

Application filed October 2, 1882. (Model.)

*To all whom it may concern:*

Be it known that I, HENRY MISHLER, of Mogadore, in the county of Summit and State of Ohio, have invented certain new and useful Improvements in Potters' Lathes; and I do hereby declare the following to be a full, clear, and exact description of the invention, such as will enable others skilled in the art to which it pertains to make and use it, reference being had to the accompanying drawings, which form part of this specification.

My invention relates to an improvement in potters' lathes; and it consists in the combination of an upright, a head, or frame which will turn freely thereon, and which can be locked in any desired position, and a horizontally-moving carrier to which the rib or forming-tool is pivoted, and the head upon which a mold is placed, as will be more fully described hereinafter.

The object of my invention is to produce a lathe in which four separate and distinct movements are given to the forming-tool, whereby the lathe is adapted for making articles of all kinds.

Figure 1:
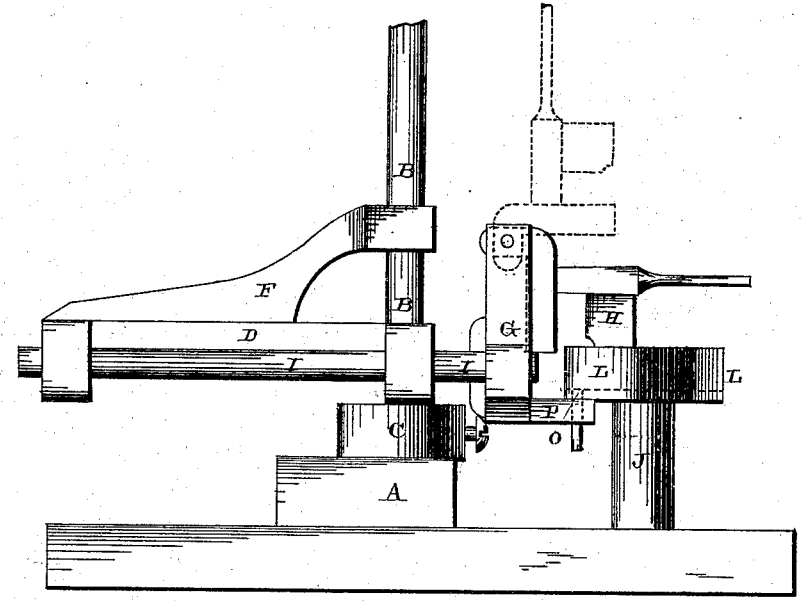
Figure 2:
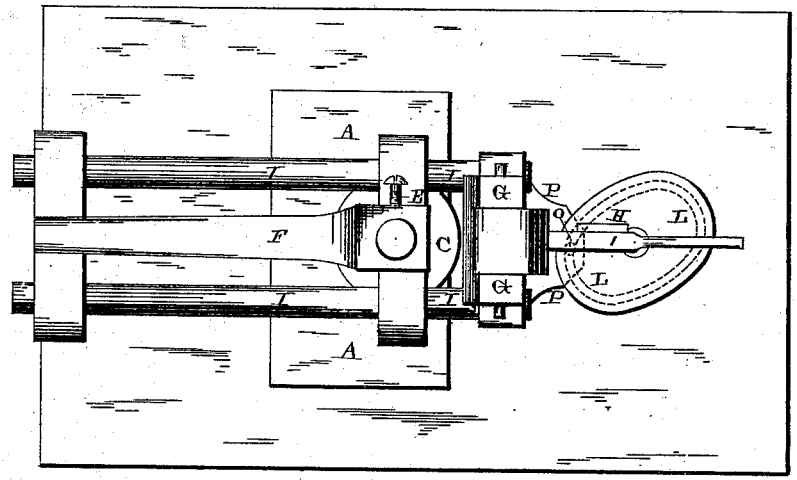

Figure 1 is a side elevation of my invention. Fig. 2 is a plan view of the same.

A represents a suitable base or support, from the top of which rises the round standard B. Over this standard, and resting upon the base, is placed a suitable block, C, which may be of any thickness desired, according to the article that is to be made. This block is provided with a set-screw, so that it can be clamped to the upright and held rigidly in position. Also, passed down over the top of this upright is the head or frame D, which can be turned freely thereon in any direction, moved vertically thereon, or clamped rigidly thereto by means of the set-screw E. Rising from the top of this head is the brace F, which has an opening made through it, so as to pass down over the standard, and which brace serves to hold the frame steadily in place, so as to prevent any wabbling or shaking movement while the lathe is in use. This head or frame serves as the guide and support for the carrier G, to which the forming-tool H is pivoted.

Extending horizontally backward from the carrier are the two parallel rods I, which pass through openings made for them in the head or frame, and which serve to guide the carrier back and forth in its movements. The rib or forming-tool will be provided with a cord, pulley, and weight, so that the tool will be automatically thrown up when released, and thus at once moved out of the way.

In front of the machine is placed the pivotal post or standard J, upon which the heads L, of any suitable shape, are pivoted. This head forms the support upon which the mold is placed, and will vary in shape with the article that is to be produced. Where a long dish or other article is to be made, an oblong head is used having an oblong groove in its under side, so as to catch over the top of the stud or projection O, formed upon the extension P of the carrier. This groove, when the head is made to run in the usual manner, draws the carrier in and out, so that the forming-tool automatically conforms to the shape of the article that is being made. If a round article is to be made, the oblong grooved head is removed, and then the carrier is drawn out, so that the forming-tool, when pressed down, will come in just the proper position and form the article. While the round article is being made a set-screw is used to clamp the guiding-rods of the carrier in place, so that they will not move endwise, and then a round-ware machine is produced.

It will be seen that this machine can be moved freely up and down upon the upright, moved back and forth so as to conform to the required movement in making an oblong article, and can be moved freely back and forth horizontally, according to the kind of ware that is to be made. By means of the construction here shown all round and oblong ware that is now made by hand can be made by machinery.

Having thus described my invention, I claim—

1. In a potter's lathe, the combination of an upright and a head or frame pivoted thereon, which can be adjusted vertically, with the carrier for the forming-tool, substantially as shown.

2. In a potter's lathe, the combination of an upright, a head or frame placed thereon, with the carrier for the forming-tool, the carrier being adapted to be moved horizontally back and forth, substantially as set forth.

3. In a potter's lathe, the combination of an upright or standard, a head or frame movably placed thereon, a horizontally-moving carrier for the forming-tool, and which carrier is provided with a stud or projection, and a grooved head which catches over the stud or projection, whereby the forming-tool is made to automatically move back and forth when the head is revolved, substantially as specified.

In testimony whereof I affix my signature in presence of two witnesses.

HENRY MISHLER.

Witnesses:

ALBT. V. HULL,
ERNEST SMITH.